United States Patent [19]

Heitmann

[11] 4,043,864
[45] Aug. 23, 1977

[54] NUCLEAR POWER PLANT HAVING A PRESSURIZED-WATER REACTOR

[75] Inventor: Hans-Günther Heitmann, Buckenhof, Germany

[73] Assignee: Kraftwerk Union Aktiengesellschaft, Mulheim (Ruhr), Germany

[21] Appl. No.: 317,604

[22] Filed: Dec. 22, 1972

[30] Foreign Application Priority Data

Dec. 22, 1971 Germany .................. 2163695

[51] Int. Cl.² ............................. G21C 19/30
[52] U.S. Cl. ...................... 176/37; 176/65; 210/222
[58] Field of Search ............ 176/37, 65, 92 R; 210/222

[56] References Cited

U.S. PATENT DOCUMENTS

| 2,879,157 | 3/1959 | Batutis et al. | 176/37 |
| 2,990,354 | 6/1961 | Anderson et al. | 176/46 |
| 3,143,496 | 8/1964 | Maretzo | 210/222 |
| 3,211,622 | 10/1965 | Brown | 176/65 |
| 3,222,255 | 12/1965 | Maldague | 176/65 |
| 3,400,048 | 9/1968 | Boardman et al. | 176/37 |
| 3,539,509 | 11/1970 | Heitmann et al. | 210/222 |
| 3,651,866 | 3/1972 | Lileg et al. | 176/37 |
| 3,663,725 | 5/1972 | Pearl | 176/92 R |

FOREIGN PATENT DOCUMENTS

| 2,013,679 | 10/1971 | Germany | 176/37 |
| 1,816,859 | 8/1970 | Germany | 210/222 |

*Primary Examiner*—Harvey E. Behrend
*Attorney, Agent, or Firm*—Herbert L. Lerner

[57] ABSTRACT

Nuclear power plant having a pressurized water reactor includes a primary circulatory loop wherein the reactor is connected, and an electromagnetic filter connected in shunt with the primary circulatory loop.

1 Claim, 1 Drawing Figure

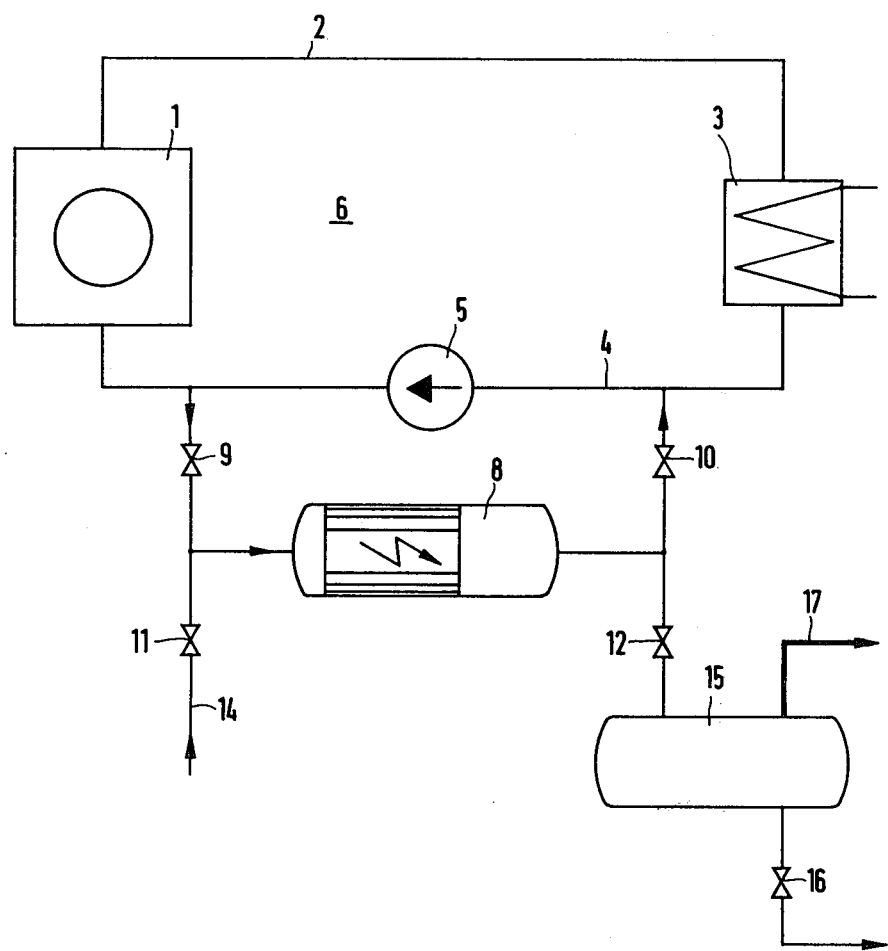

NUCLEAR POWER PLANT HAVING A PRESSURIZED-WATER REACTOR

The invention relates to a nuclear power plant having a pressurized-water reactor.

To purify the coolant contained in the primary circulatory loop, it has heretofore been necessary to provide an ion exchanger, for which a partial flow of the circulating primary coolant, such as water, had to be cooled down to a low temperature of about 50° C with simultaneous reduction of the pressure. The purified water had to be returned thereafter through high-pressure pumps to the primary circulatory loop via a heat exchanger. In view of the consequent high cost only a small amount of coolant can be purified.

It is accordingly an object of the invention to provide an improvement of the purification which avoids costly cooling and pressure reduction.

With the foregoing and other objects in view, there is provided, in accordance with the invention, a nuclear power plant having a pressurized-water reactor and further comprising a primary circulatory loop wherein the reactor is connected in shunt with the primary circulatory loop.

It has been found that the corrosion products in the primary circulatory loop of a nuclear power plant with pressurized-water reactor largely consist of ferromagnetic oxides which are reparable or removable by means of a magnetic filter. Through the application of the instant invention, extensive purification of the coolant is possible without cooling, as electromagnetic filters are suitable for temperatures of up to 350° C, such as prevail in the primary circulatory loop of pressurized-water reactors. It is also necessary to place the coolant under slight pressure, since electromagnetic filters can be constructed pressure-tightly for the normal operating pressure at quite tolerable cost.

The shunt connection of the electromagnetic filter in accordance with the invention has the advantage that the filter can be cleaned without interrupting the operation of the nuclear powerplant.

In accordance with a further feature of the invention, the electromagnetic filter is connected in parallel to different components of the primary circulatory loop since the flow resistance thereof is small, so that no large pressure difference is required. The electromagnetic filter if preferably connected parallel to a coolant pump, in accordance with the invention.

So as to be able to clean the electromagnetic filter at any time, in accordance with yet another feature of the invention, valves are provided for shutting off the filter from the primary circulatory loops, and a flush line is connected to the filter. The valves are advantageously remote-controlled.

In accordance with an added feature of the invention, means are provided for actuating the valves to shut off the electromagnetic filter from the primary loop in the event of a power failure.

In accordance with an additional feature of the invention, the flush or rinsing line leads to a waste water tank of a nuclear waste water treatment system.

Other features which are considered as characteristic for the invention are set forth in the appended claims.

Although the invention is illustrated and described herein as Nuclear Power plant having a Pressurized-Water Reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic pipe-line diagram showing the nuclear power plant of the invention.

Referring now to the drawing, there is shown therein a pressurized-water reactor 1, which is connected through a so-called "hot line" 2 to a steam generator 3. In the return line 4, which is called the "cold line", there is connected a coolant pump 5. The "hot" and "cold" lines 2 and 4, the steam generator or heat exchanger 3 and the pump 5 form the primary circulatory loop of the pressurized-water reactor 1. A secondary circulatory loop of the nuclear power plant, which includes the turbine and other appurtenances is omitted from the drawing for the sake of clarity.

Shunted across the coolant pump 5 is an electromagnetic filter 8, which is formed of a filter container filled with steel balls, and surrounded by an electromagnetic coil. The coil is supplied with dc current, so that it is capable of generating a strong magnetic field. Consequently, ferromagnetic impurities in the coolant flow through the filter 8 are retained at the steel balls.

The electromagnetic filter 8 is connected to the primary circulatory loop 6 by means of two remote-controlled valves 9 and 10. Two additional valves 11 and 12 connect the electromagnetic filter 8 to a flush water line 14 which leads through a waste water tank 15 to a non-illustrated nuclear waste water treatment system located downstream of a valve 16. Vapors produced upon decompression are discharged through the line 17.

In normal operation, the valves 9 and 10 are always open. A considerable part, such as 1% for example, of circulating quantity of the water which is present as coolant in the primary circulatory loop, flows through the electromagnetic filter 8. To clean the filter 8, which is necessary at intervals of 1 to 2 weeks, the valves 9 and 10 are closed by remote control. After the filter 8 is demagnetized electrically, the valves 11 and 12 are opened and permit flushing or rinsing of the filter 8 with hot or cold water into the waste water tank 15.

Since the remote control of the valves, for example an electromagnetic control, is constructed so that in the event of disturbances the valves 9 and 10 are closed, assurance is provided that the operation of the reactor is not affected thereby.

I claim:

1. The nuclear power plant having a pressurized water reactor connected in a primary circulatory loop wherein a pump is also connected for circulating a coolant therein, an electromagnetic filter device having an inlet and an outlet and connected by said inlet and said outlet in direct shunt with a portion of the primary circulatory loop so that a portion of the coolant is passed therethrough and nuclear waste contained in the coolant is filtered-out therein, an inlet valve and an outlet valve respectively connected to said inlet and said outlet of said filter device and, in turn, connecting said filter device in parallel with the primary circulatory loop, a rinsing line and a waste line for said filter device, a rinsing line valve connecting said inlet of said filter device to said rinsing line, and a waste line valve connecting said outlet of said filter device to said waste line, said inlet and said outlet valves being closable so as to discontinue the flow of coolant through said electromagnetic filter device from said primary circulatory loop, and said rinsing line valve and said waste line valve being openable so as to flush accumulated waste out of said filter device independently of the continued circulation of coolant in the primary circulatory loop.

* * * * *